July 13, 1954   H. FRIEDMAN   2,683,813
ALPHA RAY TACHOMETER
Filed June 30, 1950
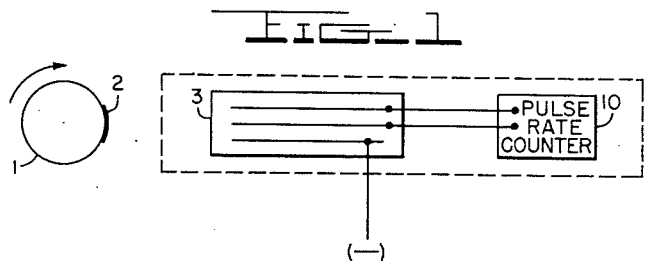
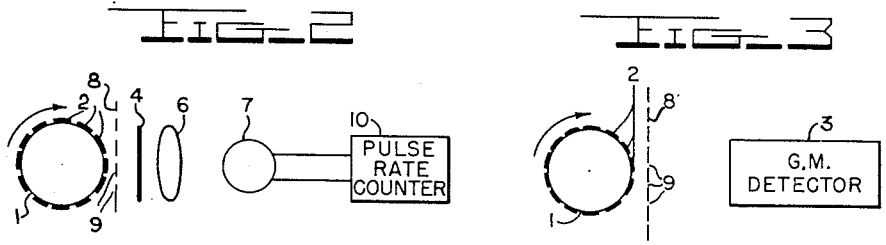
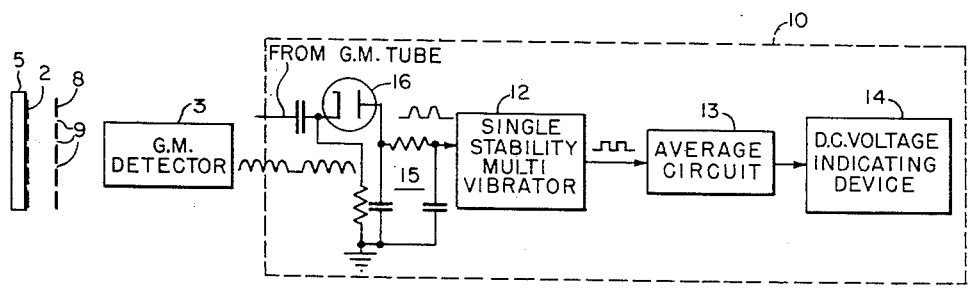
INVENTOR
HERBERT FRIEDMAN
BY
ATTORNEYS

Patented July 13, 1954

2,683,813

UNITED STATES PATENT OFFICE 2,683,813

ALPHA RAY TACHOMETER

Herbert Friedman, Arlington, Va.

Application June 30, 1950, Serial No. 171,490

4 Claims. (Cl. 250—71)

(Granted under Title 35, U. S. Code (1952), sec. 266)

This invention relates to a method and apparatus for measuring the motion characteristics of moving apparatus.

The engineer is often confronted with the problem of measuring the revolutions of a shaft or the degree of vibration or strain of a material under working conditions. Some prior art methods accomplished this result by specially constructing shafts or moving members with physical projections which when moved relative to a magnetic circuit registered a change in the electrical circuit associated therewith. In other prior art systems mirrors were attached to the body under surveillance and by means of a critically placed light source and a phototube or reflecting surface, the movement of the body is thereby measured.

In the method where projections are placed on the shaft, either the shaft was made with this measuring method in mind or a special attachment to the shaft had to be constructed.

In the method where the reflecting mirror is used, if a shaft is the moveable element to be measured, the mirror had to be specially shaped to fit the shaft. Also the position of the light source and reflecting surface or phototube had to be critically located.

With these often cumbersome prior art methods in mind, the method and apparatus forming the present invention was developed to facilitate the measurement of the characteristics of motion or movement such as degree, strain, vibration, and speed of revolution of moveable objects.

When the movement of small objects is to be observed, the problem of the weight added by the measuring elements connected thereto is often important. The present invention greatly decreases any interference which the measuring instrument apparatus may have on the material whose movement or motion is to be measured.

One object of the invention is therefore to provide a simple, sensitive method and apparatus for conveniently measuring the characteristics of motion or movement of various materials.

Another object of this invention is to provide a method and apparatus for measuring the motion or movement of a moveable element which does not interfere with the movement or motion to be measured.

The manner in which the foregoing and other objects, that will become apparent to those skilled in this art, are achieved is set forth in the following description which should be read in connection with the accompanying drawings wherein:

Figure 1 is a diagrammatic view of one embodiment of the apparatus used to measure the rate of revolution of a shaft using a radioactive emitting material located thereon.

Figure 2 is a diagrammatic view of another embodiment of the invention which utilizes an alpha ray emitting material placed on the shaft.

Figure 3 is a diagrammatic view of a modification of the apparatus of Figures 1–2 wherein a plurality of radioactive lines and a masking element are utilized.

Figure 4 is a diagrammatic view of an application of the embodiment of Figure 3 used to measure vibration or strain in a flat plate.

Figure 5 is a block diagram showing the elements of the pulse rate counter.

It is well known that such radioactive materials, as radium, polonium and plutonium emit constant amount of energy in the form of alpha and beta rays. It is also well kown that there are a number of inexpensive and sensitive devices for detecting the presence of these rays.

The present invention makes a novel and extremely useful application of these radioactive materials and the above mentioned detecting devices.

In accordance with the teachings of the present invention a small amount of a radioactive material is immersed in a binder such as dilute collodium and painted or otherwise deposited on the object to be tested. This produces a ready source of energy which does not interfere with the movement of even the lightest of objects and is easily applied. Radioactive polonium, for example, can be easily plated on if the method is desired. According to the particular motion to be measured, various other elements are associated with the painted object to effectively detect its movement.

As previously mentioned, there are various devices available to detect radioactive rays. Ionization chambers are well known detecting means of which the Geiger-Mueller tube is a good example. In Figure 1 to which reference is now made, a Geiger-Mueller tube 3 is placed opposite a rotary shaft 1 whose movement it is desired to study. Deposited on the shaft 1 is a source of radioactive material 2. When the radioactive material 2 deposited on shaft 1 is in the angular position closest to tube 3, the resulting current delivered by tube 3 to the associated circuit 10 of which it is a part is a maximum since obviously tube 3 is then receiving the maximum amount of energy from radioactive material 2. When the shaft 1 is in such a position that radioactive material 2 is on the side of shaft 1 opposite tube 3, then no energy is detected by tube 3 since the shaft 1 blocks the energy from tube 3. The output of the Geiger-Mueller tube 3 in Figure 1 would consist of one burst or group of pulses per revolution of shaft 1. The individual pulses of the group represent the typical response of a Geiger-Mueller tube to the presence of radioactive material.

These pulse groups are fed to a pulse rate counter 10 (see Figure 5 to which reference is now made) whose object is to count the number of pulse groups. To accomplish this the pulses are rectified by diode 16 and then the individual pulses are removed by filter circuit 15 whose output consists of the modulation waveform of the pulse groups. To accomplish this, the time constant of filter circuit 15 is made small relative to the smallest expected interval between pulse groups but long with respect to the width of the pulse of each pulse group.

Due to the fact that the width of the pulse group varies with speed of shaft 1, the pulses at the output of filter circuit 15 are fed to a constant width pulse generator 12 which may be a conventional single stability multivibrator which generates 1 constant width and constant amplitude pulse per input pulse from filter circuit 15. An averaging or integration circuit 13 is coupled to the output of multivibrator circuit 12 which develops a direct current voltage equal to the average value of the output pulse from multivibrator 12. The voltage of course is proportional to the rate of the pulses from multivibrator 12. A direct current indicating device 14 measures the direct current voltage and may be calibrated in revolutions per minute.

It should be understood that the pulse counter circuit shown is exemplary only.

Certain radioactive materials, such as polonium and plutonium, emit appreciably only alpha rays while strontium (90) emits only appreciable amounts of beta rays. The particular choice of material to use is determined by the use to which the present invention is to be put and also the particular Geiger tube available.

For example, when alpha ray emitting materials are used, thin window Geiger-Mueller tubes must be used, while with beta ray emitting thicker windows can be used (the window is the portion of the Geiger-Mueller tube through which the rays to be measured are to pass).

When definition is important, a masking element having a series of apertures (element 8 in Figures 2-4) is disposed between the detecting element and the emitting material. In this embodiment alpha ray emitting materials are preferable.

When high speeds or movements are to be measured, the Geiger-Mueller tube is preferably operated in the proportional counter region since here it has the quickest response to changes in the movement to be detected since no quenching or de-ionizing time is required as in the Geiger counter region.

Thus to improve the sensitivity of the system disclosed in the embodiment of Figure 1, the modification of Figure 3 can be used. Here a plurality of narrow bands of radioactive material 2 have been painted or plated on shaft 1 and a masking element 8 having a plurality of narrow openings 9 corresponding with the bands of radioactive material on shaft 2 is placed between the detecting element and the shaft 1. (The masking element 8 if wrapped around the shaft 1 could be used as a mask for spraying the radioactive material 2 on shaft 1.) It is important that all of the bands are simultaneously aligned with the aperture of the mask, and also simultaneously screened by the masking element 8.

In the embodiment of Figure 3, even though the shaft 1 rotates relatively slowly, a high rate of current pulses delivered by the detecting element results because of the plurality of openings in mask 8. Also, a greater amount of energy is received as compared to a situation where the mask 8 had only 1 slit. As previously stated, alpha rays give better definition (that is as the areas of radioactive material pass by the opening of a mask, 8, the energy which passes through the openings is more nearly proportional to the area of the radioactive material which is uncovered by the opening), and so utilizing a radioactive material 2 which emits alpha rays is preferred with this embodiment.

The materials applicable for radioactive screening elements of which masking element 8 is made is well known in the art. For example, any thin paper or foil is an excellent screening medium for alpha rays.

Another detecting means which is most convenient for many applications is a phosphor screen. For example, when an alpha ray emitting material is used, a zinc-sulfide phosphor screen will emit light whenever alpha rays strike the screen. Thus in Figure 2, a zinc-sulphide phosphor screen has taken the place of Geiger-Mueller tube 3 in Figure 1. Then, depending on the size of screen 4 and the shaft 1, the light may be received directly or a given size lens 6 may be used to focus the light developed on screen 4 on a phototube 7. The tube 7 delivers pulses of current to circuit 10, which, as stated before, contains a source of voltage for the detecting tube and also a pulse rate counter circuit.

The use of a phosphor to detect the rays emitted by radioactive material 2 is especially convenient where the masking element 8 is to be used. Here the portion of the masking element which contains the openings 9 can extend over a much greater length than the phototube limitations, and by use of a simple focusing lens 6, a concentrated beam can be directed toward phototube 7 resulting in improved sensitivity.

Motion characteristics other than the revolution rate of a rotating shape can be measured by means of the present invention.

It may be desirable to measure the amount of movement due to some force placed on a flat plate or bar 5, Fig. 4. Several areas of radioactive material have been painted or plated on plate 5. A mask 8 has been placed between the detecting element and plate 4. Assuming that under no load the radioactive areas are completely screened by mask 8 and that a slight movement of the surface of plate 5 facing the mask in any direction up or down will bring areas of radioactive material directly over the opening 9, a very sensitive strain indicating device results.

With the embodiment of Figures 3 and 4, vibrational characteristics of shaft 1 or plate can be detected.

Thus it can be seen that, with the aid of the present invention, a very sensitive and easily applied method and apparatus for measuring the motion or movement characteristics of various members results.

It should be understood that many modifications can be made of the examples given in the specification and drawings without deviating from the scope of the present invention.

The invention described herein may be manufactured and used by or for the Government of the United States of America for governmental purposes without the payment of any royalties thereon or therefor.

What is claimed is:

1. A member whose characteristics of motion are to be measured, a plurality of small areas of radioactive material located thereon, a masking element positioned adjacent the portion of said member having the radioactive areas, said element having a plurality of small apertures therein, means responsive to the energy emitted by said radioactive material located adjacent to the side of said masking element which is remote from the said member, said member being movable relative to said masking element and responsive means.

2. A member whose characteristics of motion are to be measured, a plurality of small areas of radioactive material located thereon, means responsive to the energy emitted by said areas of radioactive material by emitting light rays when said energy impinges thereon, masking means located between said member and said responsive means for blocking the passage of said energy to a degree proportional to the position of said member relative to said masking means, said masking means having a plurality of apertures therein which correspond in size and spacing to said radioactive areas, and means responsive to said light rays located opposite said energy responsive means.

3. A system for measuring the characteristics of motion of a member comprising, a plurality of narrow areas of radioactive material located on said member, means responsive to radioactive energy to provide an output signal dependent upon the amount of incident energy from said radioactive areas, and masking means located between said member and said responsive means for blocking the passage of radioactive energy to said responsive means, said masking means having a plurality of apertures corresponding in size and spacing to said radioactive areas, whereby any relative movement between said member and said masking means results in a change in the output signal of said responsive means.

4. A member whose characteristics of motion are to be measured, said member including a plurality of narrow, radioactive emissive areas, means responsive to radioactive energy to provide an output signal dependent upon the amount of incident energy from said radioactive areas, and masking means located between said member and said responsive means for blocking the passage of radioactive energy to said responsive means, said masking means having a plurality of apertures corresponding in size and spacing to said radioactive areas, whereby any relative movement between said member and said masking means results in a change in the output signal of said respnsive means.

References Cited in the file of this patent

UNITED STATES PATENTS

| Number | Name | Date |
| --- | --- | --- |
| 1,806,375 | Tiedeman | May 19, 1931 |
| 2,301,396 | Graf | Nov. 10, 1942 |
| 2,399,061 | Rosenblum | Apr. 23, 1946 |
| 2,401,288 | Morgan et al. | May 28, 1946 |
| 2,501,560 | Blau | Mar. 21, 1950 |
| 2,542,822 | Longini | Feb. 20, 1951 |
| 2,559,849 | Covert | July 10, 1951 |
| 2,566,868 | Allia | Sept. 4, 1951 |